United States Patent Office 3,425,556
Patented Feb. 4, 1969

3,425,556
APPARATUS FOR SEPARATING DRIP OIL FROM BILGE WATER
Helmut Völker, Modling, Austria, assignor to Simmering-Graz-Pauker Aktiengesellschaft fur Maschinen- Kessel- und Waggonbau, Vienna, Austria, a corporation of Austria
Filed July 19, 1966, Ser. No. 566,430
Claims priority, application Austria, July 22, 1965, A 6,769/65
U.S. Cl. 210—104
Int. Cl. B01d 57/00
7 Claims

ABSTRACT OF THE DISCLOSURE

A system for separating oil from water and disposing of the oil by combustion wherein a level control supplies an oil/water mixture to a storage container and maintains the mixture at a predetermined height while a combustion chamber alongside the container is in heat-exchanging relationship with the liquid-level region thereof and oil floating close to the liquid level is transferred to a burner destroying the oil.

---

Figure 1:
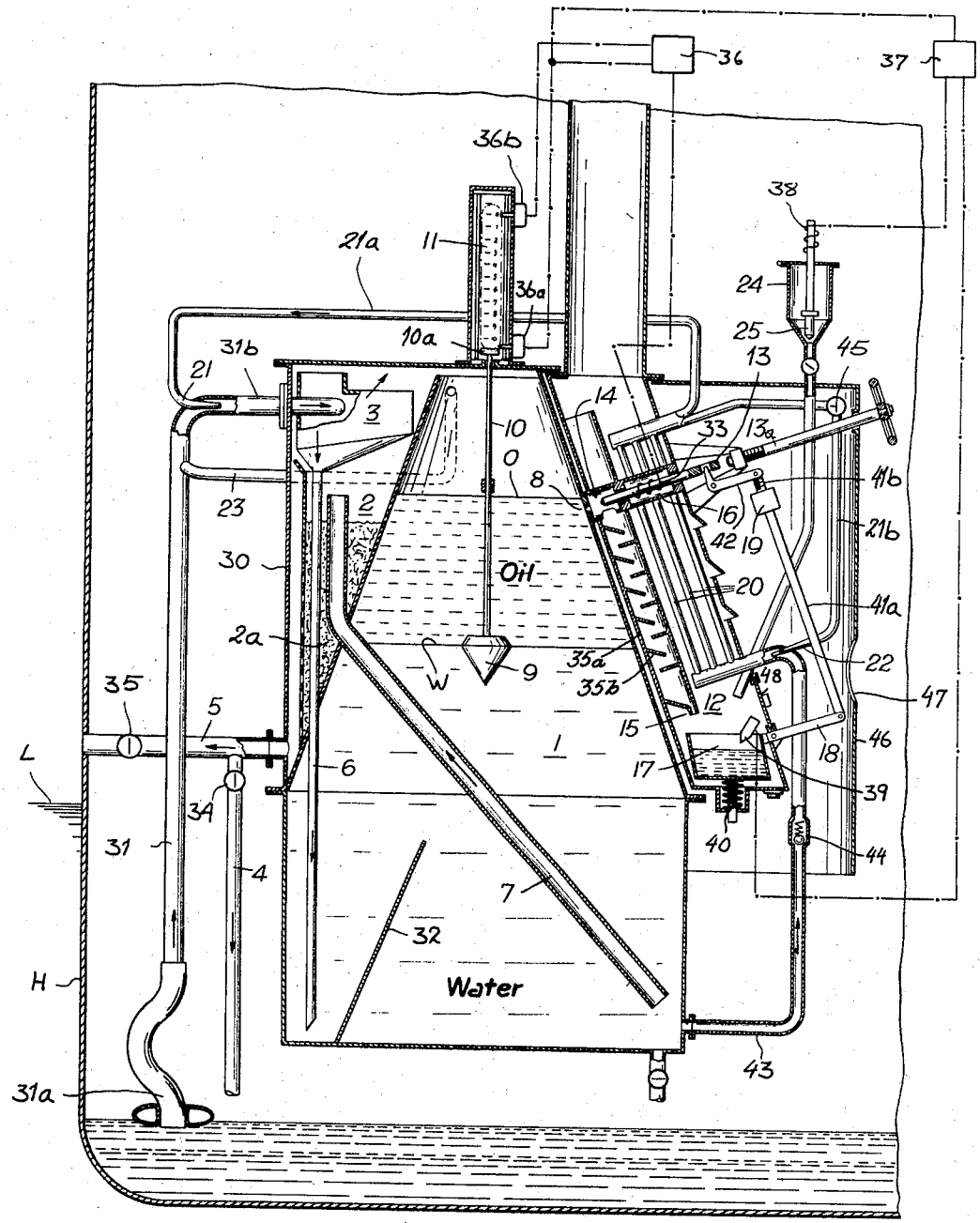

My present invention relates to apparatus for separating drip oil from bilge water in ships, including disposal of the oil by combustion.

In the removal of bilge water from ships it is generally found that the same is contaminated, to a greater or less extent, with drip oil whose discharge overboard should be avoided, except under emergency conditions, as a potential health and safety hazard. It thus becomes necessary to separate the oil from the bilge water before the latter is dumped, the separated oil being best disposed of by burning. The equipment heretofore used for this purpose, however, has generally been either lacking in efficiency or relatively complex and expensive; thus, the delivery of an oil/water mixture to a burner by pumping action results in the formation of a rather viscous emulsion which tends to clog the usual burner nozzles and which will not sustain a continuous combustion. Also, particularly in larger installations, considerable energy must be supplied for circulating the oil-contaminated bilge water through the separator and into the drainage system by which it is to be discharged from the vessel.

The general object of my present invention is to provide means for more expeditiously stripping the bilge water from its oil content with avoidance of the aforestated drawbacks.

A more particular object of this invention is to provide a system of this character which is substantially self-sustaining and self-regulating so as to adjust itself almost or completely automatically to different operating conditions.

In accordance with an important aspect of my invention, the mixture of drip oil and bilge water to be separated is stored in a container so that the oil accumulates at the top in the form of a floating layer, this oil being then transferred to an ignition zone in an adjacent combustion chamber where it is ignited; the heat developed from the resulting flame is utilized in part to generate steam which, in turn, is used to promote the supply of additional oil/water mixture to the storage container, the remainder of the combustion heat (or a portion of that remainder) being allowed to pass into the container in the region of the floating oil layer so as to reduce the viscosity of this oil prior to its entry into the combustion chamber. The water needed to generate the steam may be taken directly from the bottom of the storage container and, advantageously, is returned to this container through an injection nozzle located in an inlet pipe as a means for delivering fresh oil/water mixture from the bilges to the container; other forced-feed means operated by steam, such as vapor-driven rotary pumps, may be used for the same purpose instead of or in addition to the injector.

In order to insure that the burned of the combustion chamber receives only oil and no water from the fluid mixture in the storage container, a system embodying my invention includes level-control means advantageously comprising an elevated tank above the desired liquid level, a feed pipe leading from the tank into the container and an overflow pipe extending from a location near the container bottom to a point outside the container, the bodies of liquid in two pipes and in the container being overlain by a common air space so that the elevation of the open top of the overflow pipe determines the liquid level in the container; liquid issuing from the overflow pipe is caught in a drain which leads to the exterior of the vessel at a point above the water line. A branch of this drain, however, may return the cleansed water to the hold of the ship in a process of continuous recirculation if the amount of bilge water present is insufficient to warrant a dumping overboard.

Figure 2:
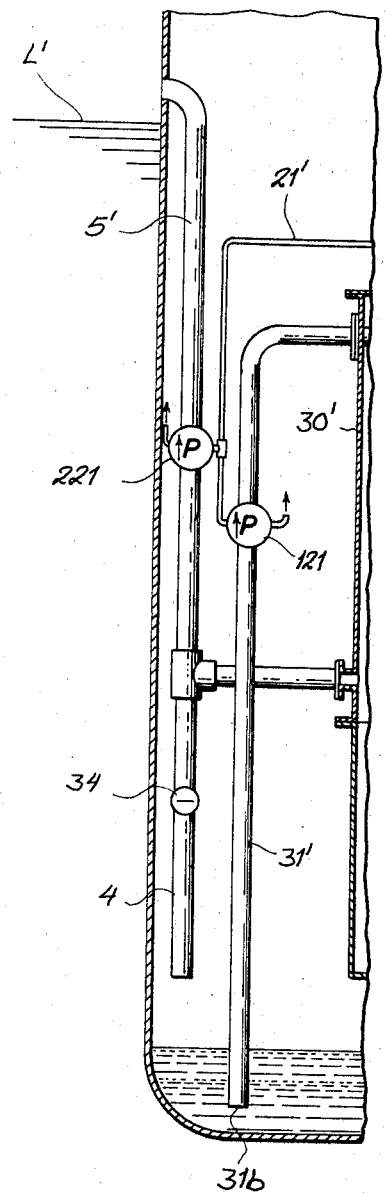

The above and other features of my invention will be described in greater detail with reference to the accompanying drawing in which:

FIG. 1 is a partly diagrammatic illustration, in vertical section, of a system for separating drip oil from bilge water in accordance with my invention; and FIG. 2 is a fragmentary view similar to FIG. 1, showing a modification of certain elements.

In FIG. 1 I have diagrammaticaly indicated a part of the hull H of a ship equipped with a system according to this invention. This system comprises a container 1 which, together with a surrounding filter compartment 2, is formed in a closed housing 30 which also accommodates an elevated tank 3 near the upwardly tapering upper end of container 1. A floating intake 31a as the bottom of an inlet pipe 31 serves for the aspiration of bilge water which is discharged into the tank 3 via an outlet 31b of this pipe. A feed pipe 6 descends from tank 3 toward the bottom of container 1 and is separated by a baffle 32 from the intake end of an overflow pipe 7 which terminates outside the container within the filter compartment 2 underneath tank 3. Compartment 2 is filled with a preferably filamentary filtering mass 2a (e.g. glass fibers) facilitating the separation of entrained air from the water discharged by the pipe 7. A drain 5 penetrates the hull H above the water line L of the vessel and also communicates with a return pipe 4, the two pipes 4, 5 being selectively openable and closable by respective shut-off valves 34, 35.

Tank 3, overflow pipe 7 and container 1 are all open at the top within the closed housing 30 so that the same pressure bears upon the respective bodies of liquid therewithin. As long as the feed means in inlet pipe 31, described hereinafter, maintains a supply of liquid in tank 3, some liquid will continuously overflow at the top of pipe 7 and the location of this top will correspond to the liquid level 0 in container 1. The mixture of oil and liquid in this container separates by gravity, upon prolonged storage, so that a layer of oil will float on a body of water and will form therewith an interface W. The water level at the interface W supports a densimetric float 9 suspended from a stem 10; the top 10a of this stem is disposed in a transparent tube 11 to indicate visually, against an engraved scale, the location of the water level W whose distance from the substantially fixed oil level 0 represents the thickness of the floating oil layer.

An orifice 8 in the wall of container 1, just below the liquid level 0, leads into a duct 35a having baffles 35b along which a flow of oil from the container can enter a combustion chamber 12 through a spout 15. A passage 14, situated between orifice 8 and duct 35a, contains a needle valve 13 adapted to control the flow of oil through the orifice. Valve member 13, slidably guided in a sleeeve 16, is displaceable by means of a solenoid 33 under the control of a toggle relay 36 which is accuatable, in dependence upon the water level W, by means of two limit switches 36a, 36b adapted to be tripped by the head 10a of float stem 10. The lower limit switch 36a, when closed by the head 10a, also triggers a pulse generator 37 which in turn energizes a solenoid 38 for the momentary retraction of a plug 25 in a fuel reservoir 24 and, at the same time, operates an igniter 39 in combustion chamber 12. A simple oil burner in this combustion chamber is constituted by a pot 17 which catches the discharge from spout 15 to form a pool of oil just below the igniter 39. Pot 17, balanced by a supporting spring 40, is articulated to an arm 18 forming part of a linkage which also includes rods 41a, 41b and a lever 42; a threaded collar 19, forming an extension of rod 41a engages rod 41b for the adjustment of the effective length of the linkage. Lever 42 grips, with the necessary play, the valve member 13 which is thus biased away from orifices 8 by the spring 40 and which, independently of solenoid 33, can be brought into closing position by the weight of surplus oil in pot 17, e.g. in the event of a misfiring of igniter 39. Valve 13 can also be closed manually by means of a spindle 13a.

Above the burner pot 17 there is disposed a bank of water tubes 20 whose lower ends are connected via a riser pipe 43, containing a check valve 44, with the bottom of container 1. The upper ends of tube 20 communicate with a conduit 21a which terminates in a nozzle 21 within the outlet end 31b of feed pipe 31. A branch 21b of conduit 21 leads to another steam-injection nozzle 22 which opens into the upper extremity of pipe 43; this branch 21b may be closed by a valve 45. The boiler assembly 20 and the burner 17 in combustion chamber 12 are separated from the liquid within container 1 by walls of good thermal conductivity so that the heat of the oil flame is partly transmitted to the interior of the container to increase the fluidity of the floating oil layer therein; the remaining heat vaporizes the water drawn into the tubes 20 via pipe 43, if need be with assistance of steam fed back through injector 22, it being noted that the lowest water level W lies above the inlet end of the tubes 20. Naturally, some of the generated steam could also be utilized for other purposes. The burner and boiler assembly is further surrounded by a shield 46 which has an access opening 47 for the manipulation of a slider 48 controlling the admission of primary air to combustion chamber 12.

A pipe 23 opens into pipe 31 just below injector 21 and terminates in the neck of container 1 above level 0 to aspirate the oil mists tending to accumulate therein.

In operation, dosing valve 25 is momentarily withdrawn, manually or under the control of float 9 and switch 36a, to admit an initial fuel supply (e.g. kerosene) to the burner pot 17; igniter 39 is actuated at the same time to initiate combustion. Water accumulated in container 1 and present at the lower end of tubes 20 is vaporized and, with needle valve 13 in its open position (e.g. after an initial withdrawal of spindle 13a), preheated oil from container 1 passes through orifice 8 into combustion chamber 12 to sustain the flame. The steam thus generated issues from nozzle 21 to create suction in inlet pipe 31 whereby further bilge water is delivered to tank 3 and container 1, thus maintaining the liquid level 0 in its illustrated position. Depending on the setting of valves 34 and 35, the overflow from pipe 7 is either dumped overboard via drain 5 or returned to the bilge for recirculation by way of pipe 4. If the burning of the oil in chamber 12 is more rapid than the introduction of new oil through feed pipe 6 into container 1, the water level W rises along with float 9 so that, eventually, switch 36b is tripped to close the orifice 8 before any water can pass therethrough. Gradually, oil accumulates again above the water in the container 1 and depresses the level W until switch 36a is tripped to restart the operation thus described.

As illustrated in FIG. 2, a pump 121 in feed pipe 31' may replace the injection nozzle 21; pump 121 and another pump 221, in drain pipe 5, are powered by steam supplied through pipe 21' from the boiler tubes 20 (FIG. 1). Naturally, pump 121 shown in FIG. 2 may be supplemented by a nozzle 21 as illustrated in FIG. 1; similarly, nozzle 22 of FIG. 1 could be replaced or supplemented by a steam pump not shown.

FIG. 2 also illustrates a positioning of the oil separator at a level below the water line L' within the vessel; drain pipe 5' therefore ascends above the container housing 30' so as to discharge the bilge water above the water line. It will also be noted that feed pipe 31' is here shown to terminate in a submerged intake 31b at a fixed level, in contradistinction to the floating intake 31a of FIG. 1; naturally, the two types of intake may be interchanged, the floating aspirator having the advantage of affording an initial partial separation of the two fluid phases. In practice, it may be more convenient to dispose such a floating aspirator in a separate intermediate storage vessel, below the level of container 30, rather than directly in the bilge as illustrated for the sake of simplicity.

I claim:
1. A system for the separation of drip oil from bilge water and disposal of the oil by combustion, comprising a storage container; inlet means for supplying an oil/water mixture to said container, said inlet means including level-control means whereby said container is maintained filled with liquid substantially to a predetermined height; a combustion chamber disposed alongside said container in heat-exchanging relationship with the region of the liquid level of said container; burner means in said combustion chamber; conduit means forming a passage to said burner means from a location inside said container close to its liquid level whereby oil floating on the water therein can be transferred to said burner means for sustaining a flame in said combustion chamber; boiler means exposed to said flame for vaporizing a supply of water; and feed means arranged and connected to be energized by steam from said boiler means, said feed means forming part of said inlet means and serving for the forced delivery of additional oil/water mixture to said container.

2. A system as defined in claim 1 wherein said feed means comprises a steam injector.

3. A system as defined in claim 1 wherein said level-control means comprises an elevated tank located above said liquid level, said inlet means discharging into said tank; a feed pipe leading from said tank into said container; an overflow pipe extending from a location in said container near the bottom thereof to a point outside said container defining the liquid level in said vessel, the bodies of liquid in said overflow pipe, said tank and said container being overlain by a common air space; and drain means positioned to catch liquid issuing from said overflow pipe.

4. A system as defined in claim 1, further comprising densimetric float means on the oil/water interface within said container and regulator means in said passage for controlling the flow of oil from said container to said burner means in accordance with the position of said float means.

5. A system as defined in claim 4 wherein said burner means is provided with a receptacle for unburned oil having means thereon connected with said regulator means for throttling the flow of oil from said container to said burner means in response to an excess of said unburned oil.

6. A system as defined in claim 1, further comprising a suction pipe connecting said inlet means with a location above the liquid level in said container for readmixing oil mists from the upper part of said container with the oil/water mixture delivered to said container.

7. A system as defined in claim 1 wherein said boiler means comprises a set of water tubes, a riser connecting said water tubes with the bottom of said container, forced-circulation means in said riser operable by steam from said boiler means for introducing water from said container into said tubes, and check-valve means in said riser for preventing the return of water from said tubes to said container.

References Cited

UNITED STATES PATENTS

| | | | |
|---|---|---|---|
| 1,490,794 | 4/1924 | Alexander | 210—84 |
| 2,054,798 | 9/1936 | Gibson | 210—72 X |
| 2,156,123 | 4/1939 | Mount | 210—72 |
| 2,377,565 | 6/1945 | McDonald | 210—114 X |
| 2,400,713 | 5/1946 | Rhees | 210—83 X |
| 2,615,528 | 10/1952 | Williams | 210—187 X |
| 3,318,448 | 5/1967 | Fryer | 210—71 |

REUBEN FRIEDMAN, *Primary Examiner.*

J. ADEE, *Assistant Examiner.*

U.S. Cl. X.R.

210—115, 123, 181, 251